May 5, 1925
Re. 16,062
C. C. TOMKINSON
BOLT ANCHOR
Original Filed Aug. 11, 1921
Fig. 1,
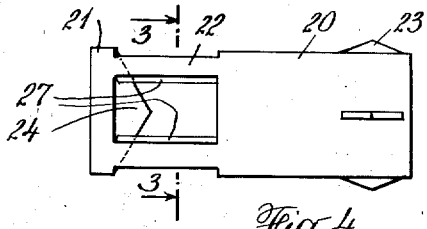
Fig. 2,
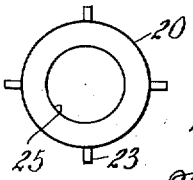
Fig. 3,
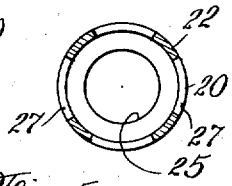
Fig. 4,
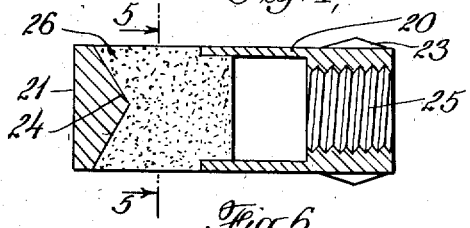
Fig. 5,
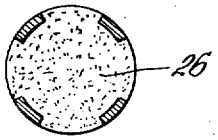
Fig. 6,
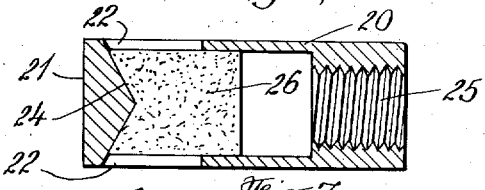
Fig. 7,
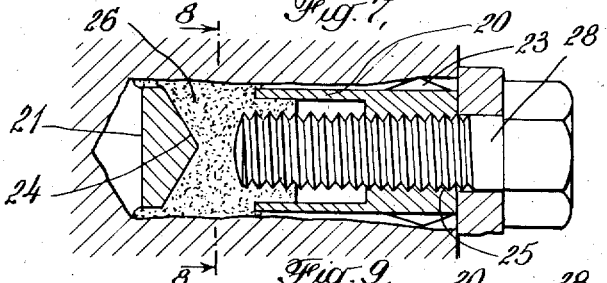
Fig. 8,
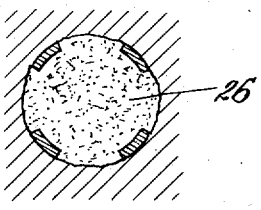
Fig. 9,
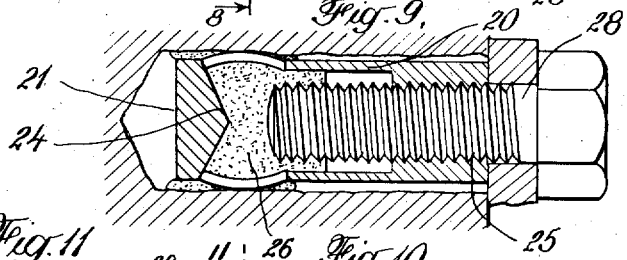
Fig. 11
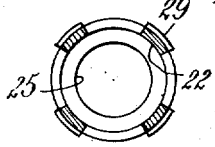
Fig. 10,
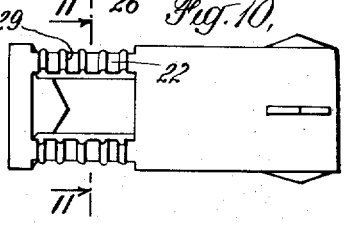
INVENTOR
Charles C. Tomkinson
BY
Marshall & Hawley
ATTORNEYS.

Reissued May 5, 1925.

Re. 16,062

UNITED STATES PATENT OFFICE.

CHARLES C. TOMKINSON, OF PLAINFIELD, NEW JERSEY, ASSIGNOR TO JOHN EDWARD OGDEN, OF MOUNTAINVILLE, NEW YORK.

BOLT ANCHOR.

Original No. 1,487,290, dated March 18, 1924, Serial No. 491,333, filed August 11, 1921. Application for reissue filed October 17, 1924. Serial No. 744,293.

*To all whom it may concern:*

Be it known that I, CHARLES C. TOMKINSON, a citizen of the United States, and a resident of Plainfield, county of Union, and State of New Jersey, United States of America, have invented certain new and useful Improvements in Bolt Anchors, of which the following is a specification.

This invention relates to Bolt Anchors such as are used in walls of brick, stone, cementitious or other material not adapted to directly receive a threaded member.

One of the objects of the invention is to provide an anchor having hard and soft metal parts so constructed and arranged that the hard metal parts will be deformed and expanded by the soft metal into engagement with the wall of the opening in which the anchor is located.

One of the objects of the invention is to provide an anchor having hard and soft metal parts so arranged that the soft metal will be forced through openings in the hard metal into engagement with the wall of the opening in addition to expanding the hard metal.

Another object of the invention is to provide an anchor comprising a hard metal shell and a soft metal expanding element, the shell having means for assisting in directing the movement of the soft metal when the latter is pressed or acted on by a thread member or bolt.

Another object of the invention is to provide a new and improved method of securing an expansion shield in a wall opening and securing an object to be supported to the shield.

Further objects of the invention will appear from the following specification taken in connection with the drawings, which form a part of this application, and in which—

Fig. 1 is an elevational view of an expansion shield constructed in accordance with the invention.

Fig. 2 is an end elevation of the outer end of the shield shown in Fig. 1.

Fig. 3 is a sectional elevation taken substantially on line 3—3 of Fig. 1.

Fig. 4 is a sectional elevation of the shield shown in Fig. 1.

Fig. 5 is a transverse sectional view taken substantially on line 5—5 of Fig. 4.

Fig. 6 is a sectional elevation of a shield shown in Fig. 1, but taken at right angles to the section shown in Fig. 4.

Fig. 7 is a sectional elevation of the bolt anchor showing the anchor in expanded position in an opening or wall.

Fig. 8 is a transverse sectional elevation taken substantially on line 8—8 of Fig. 7.

Fig. 9 is a sectional elevation of the construction shown in Fig. 7, but taken substantially at right angles to Fig. 7.

Fig. 10 is an elevation of another form of shield constructed in accordance with the invention, and Fig. 11 is a transverse sectional elevation taken substantially on line 11—11 of Fig. 10.

The invention may be briefly described as comprising a one piece shield of relatively hard metal having a body portion and a closed bottom, these parts being connected by deformable members. A soft metal filler is positioned in the shield and the bottom of the shield is constructed to direct the flow of this metal laterally when the metal is engaged by the shield member or bolt and is forced by this member in such a direction as to deform the connecting members between the bottom and body portion and to pass outwardly in the openings between the connecting members. In the particular form of the invention shown, the bottom is conical in shape thereby directing the flow of the metal which is acted on by the bolt. The shield is also provided with outwardly projecting lugs for preventing the rotation of the shield.

Like characters of reference designate corresponding parts in all views of the drawings.

The shield constructed in accordance with my invention comprises a body portion 20, a bottom 21 and deformable strips 22 which connect the body portion to the bottom. A plurality of lugs 23 is formed on the outer wall of the body portion 20 and these lugs prevent the rotation of the shield in the wall opening. The bottom 21 has an inner surface 24 conical in shape, or, expressed in other words, the surface 24 forms an acute angle with the inner wall of the shield for a purpose hereinafter set forth.

The other end of the shield has a threaded opening 25 for receiving a bolt or other threaded element.

A soft metal filler or expanding element 26 is positioned in the shield at the bottom or inner end preferably, being cast therein and entirely filling the space and extending through the openings 27 between the strips 22, the outer surface of this filler being flush with the outer wall of the shield.

Referring to Figs. 7, 8 and 9, the operation of the anchor is as follows: When the bolt or threaded element 28 is threaded into the shield, the inner end of the bolt will engage the soft metal filler 26 and will force the filler laterally through the openings 27 between the strips 22 and this movement of the soft metal will also deform the strips 22 forcing them laterally into engagement with the wall opening as shown particularly in Fig. 9. This flow of the soft metal is directed and assisted by the conical bottom surface 24.

In Figs. 10 and 11 another form of the invention is shown and in this form each of the strips 22 has formed thereon one or more outwardly extending ribs 29 and when the strips 22 are deformed the ribs will be pressed into firm and tight engagement with the wall opening thereby assisting in retaining the shield in place.

From the above description, it will be seen that an exceedingly firm and secure anchorage may be obtained by utilizing the construction described and furthermore that the construction is simple, practical and comprises few parts.

Although certain specific embodiments of the invention have been illustrated and described, it will be understood that the invention is capable of further modification and that changes in the construction and in the arrangement of the various cooperating parts may be made without departing from the spirit or scope of the invention, as expressed in the following claims.

What I claim is:

1. An anchor comprising a one piece expansion shield of relatively hard metal and having expansible elements and an expanding element consisting of a mass of relatively soft metal positioned within said shield, and substantially filling the space between said expansible elements.

2. An anchor comprising a one piece expansion shield of relatively hard metal and having expansible elements and perforations and an expanding element of relatively soft metal positioned within said shield and adapted to expand said elements and to extend through the perforations.

3. An anchor comprising a one piece expansion shield of relatively hard metal and having expansible elements, an expanding element of relatively soft metal positioned within said shield, and means for directing the flow of the soft metal laterally as the expanding element is compressed.

4. An anchor comprising a one piece expansion shield of relatively hard metal and having expansible elements, an expanding element of relatively soft metal positioned within said shield, and means carried by the shield for directing the flow of the soft metal laterally as the expanding element is compressed.

5. In an anchor, a shield having a closed bottom, spaced strips connecting the bottom to the body of the shield and a soft metal expanding element positioned in the shield adjacent the bottom and substantially filling the shield within the strips.

6. In an anchor, a shield having a closed bottom, spaced strips connecting the bottom to the body of the shield, a soft metal expanding element positioned in the shield adjacent the bottom and substantially filling the shield within the strips, and means carried by the bottom of the shield for directing the soft metal laterally through the spaces between the strips and against the strips as the soft metal element is compressed.

7. In an anchor, a shield having a closed bottom, spaced strips connecting the bottom to the body of the shield and a soft metal expanding element positioned in the shield adjacent the bottom and substantially filling the shield within the strips, said bottom having an inwardly extending conical surface for directing the soft metal laterally as the expanding element is compressed.

8. A perforated expansion shield having a closed bottom provided with a surface inclined to the wall of the shield.

9. A one piece perforated expansion shield having a closed bottom provided with a surface inclined to the wall of the shield.

10. A one piece expansion shield having spaced, longitudinal, deformable strips, and a soft metal mass disposed adjacent to and adapted to deform said strips.

11. In combination, a one piece expansion shield having spaced, longitudinal, deformable strips, and a soft metal expanding element in the shield and adapted to deform the strips.

12. A one piece expansion shield of relatively hard metal comprising a body portion, a closed bottom and a plurality of spaced longitudinal strips connecting the body portion to the bottom.

13. A one piece expansion shield of relatively hard metal comprising a body portion, a bottom and a plurality of spaced longitudinal strips connecting the body portion to the bottom, said bottom having an inwardly extending portion having surfaces forming an acute angle with the wall of the shield.

14. A one piece expansion shield having a closed bottom and having perforations in the wall adjacent the bottom, the bottom having an inner surface forming an acute angle with the wall of the shield.

15. A one piece expansion shield having a closed bottom and having perforations in the wall adjacent the bottom, the bottom having a conical inner surface.

16. A one piece expansion shield of relatively hard metal comprising a body portion, a closed bottom and a plurality of spaced, longitudinal, ribbed strips connecting the body portion to the bottom.

17. A one piece expansion shield of relatively hard metal comprising a body portion, a closed bottom and a plurality of spaced, longitudinal strips connecting the body portion to the bottom, said strips having transverse outwardly projecting portions.

18. An anchor comprising a one piece expansion shield of relatively hard metal, having a threaded bolt-receiving portion and having expansible elements and an expanding element of relatively soft metal positioned within said shield and transversely filling the space between said expansible elements.

19. An anchor comprising a one piece expansion shield of relatively hard metal, having a bolt receiving opening and having expansible elements and an expanding element consisting of a mass of relatively soft metal extending across the path of a bolt positioned in the bolt receiving opening.

20. An anchor comprising a one piece expansion shield of relatively hard metal having a threaded opening for receiving a bolt and having lateral openings and an expanding element of relatively soft metal disposed in the path of movement of a bolt positioned in the threaded opening and in a position to pass through the lateral openings.

21. An anchor comprising a one piece expansion shield of relatively hard metal, having a bolt receiving opening and a closed end opposite said opening and having expansible elements and an expanding element consisting of a mass of relatively soft metal disposed in said closed end and in the bolt receiving opening.

22. In an anchor, a shield having a closed bottom and lateral openings adjacent the bottom and a soft metal expanding element positioned in the shield adjacent the bottom.

23. In an anchor, a shield having a closed bottom and lateral openings and expansible portions adjacent the bottom and a soft metal expanding element positioned in the shield adjacent the bottom.

24. The method of securing a fastening to a wall, ceiling or other support consisting in inserting the fastening in the hole in the wall, ceiling or other support, pressing a compressible substance located within the fastening against an expanding member located in the fastening to force portions of the compressible substance radially through openings in the fastening by both compression and wedging action and into binding contact with the walls of the hole, and then securing the object to be supported to the fastening so held in the hole.

25. The method of securing a fastening to a wall, ceiling or other support consisting in inserting the fastening in the hole in the wall, ceiling or other support, pressing a compressible substance located within the fastening against a wedge located in the fastening to force portions of the compressible substance radially in two directions through openings in the fastening by both compression and wedging action and into binding contact with the walls of the hole, and then securing the object to be supported to the fastening so held in the hole.

26. The method of securing a substantially rigid expansion bolt to a wall, ceiling or other support consisting in inserting the substantially rigid expansion bolt in the hole in the wall, ceiling or other support, pressing a compressible substance located within the substantially rigid expansion bolt against an expanding member located in the substantially rigid expansion bolt, to force portions of the compressible substance radially through openings in the substantially rigid expansion bolt by both compression and wedging action, and into binding contact with the walls of the hole back from the surface of said wall or other support, and then securing the object to be supported to the substantially rigid expansion bolt.

27. A new article of manufacture comprising an expansion bolt having a hollow perforated portion adapted to extend into a hole and means to support a bolt or screw, compressible material mounted within the hollow perforated portion, and adapted to be forced radially through the perforations to make a bond or grip with a wall or other suitable support.

In witness whereof, I have hereunto set my hand this 10th day of October, 1924.

CHARLES C. TOMKINSON.